United States Patent
Narayanappa et al.

(10) Patent No.: US 10,919,613 B2
(45) Date of Patent: Feb. 16, 2021

(54) VEHICLE WITH A FOLDABLE FAIRING INTEGRATED FOOTSTEP UNIT

(71) Applicant: AIRBUS HELICOPTERS DEUTSCHLAND GMBH, Donauworth (DE)

(72) Inventors: Harish Narayanappa, Bengaluru (IN); Stefan Goerlich, Donauworth (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 275 days.

(21) Appl. No.: 16/008,331

(22) Filed: Jun. 14, 2018

(65) Prior Publication Data

US 2018/0362139 A1 Dec. 20, 2018

(30) Foreign Application Priority Data

Jun. 15, 2017 (EP) .................................... 17400039

(51) Int. Cl.
  *B64C 1/24* (2006.01)
  *B64D 9/00* (2006.01)
  *B60R 3/02* (2006.01)

(52) U.S. Cl.
  CPC .................. *B64C 1/24* (2013.01); *B60R 3/02* (2013.01); *B64D 9/00* (2013.01)

(58) Field of Classification Search
  CPC .... B64C 1/24; B60R 3/02; B64D 9/00; B61D 23/00; B60J 5/0472; B60J 5/0473
  See application file for complete search history.

(56) References Cited

U.S. PATENT DOCUMENTS

| | | | |
|---|---|---|---|
| 4,440,364 A | 4/1984 | Cone et al. | |
| 4,453,684 A * | 6/1984 | Hanks | B64C 1/24 105/430 |
| D287,714 S | 1/1987 | Short | |
| 5,181,677 A * | 1/1993 | Kaplan | B64C 1/1438 244/129.4 |
| 5,259,576 A * | 11/1993 | Howard | B64C 1/1438 244/129.4 |

(Continued)

FOREIGN PATENT DOCUMENTS

| | | |
|---|---|---|
| EP | 0884218 B1 | 4/2002 |
| EP | 1413484 A1 | 4/2004 |

(Continued)

OTHER PUBLICATIONS

Office Action for Canadian Application No. 2,997,857, dated Feb. 11, 2019, 5 pages.

(Continued)

*Primary Examiner* — Assres H Woldemaryam
(74) *Attorney, Agent, or Firm* — Brooks Kushman P.C.

(57) ABSTRACT

A vehicle with a fairing and a sliding door that is glidingly mounted to the vehicle, wherein the sliding door is associated with a foldable fairing integrated footstep unit, and wherein the foldable fairing integrated footstep unit comprises: an outer shell that is integrated into the fairing of the vehicle, the outer shell comprising an exterior surface that creates in closed state of the foldable fairing integrated footstep unit an at least approximately continuous aerodynamic surface with the fairing.

20 Claims, 7 Drawing Sheets

(56) References Cited

U.S. PATENT DOCUMENTS

| | | | | |
|---|---|---|---|---|
| 5,921,613 | A * | 7/1999 | Breunig | B60J 5/06 |
| | | | | 296/146.12 |
| 6,189,833 | B1 * | 2/2001 | Ambrose | B64C 1/1407 |
| | | | | 244/118.3 |
| 6,926,342 | B2 * | 8/2005 | Pommeret | E05D 15/1081 |
| | | | | 296/146.12 |
| 7,669,797 | B2 * | 3/2010 | Yada | B64C 1/24 |
| | | | | 192/69.7 |
| 7,765,740 | B2 * | 8/2010 | Heuel | B60J 5/062 |
| | | | | 49/360 |
| 7,883,306 | B2 * | 2/2011 | Draney | B64C 1/1423 |
| | | | | 244/118.3 |
| 7,950,719 | B2 * | 5/2011 | Elliott | B60J 5/0479 |
| | | | | 296/155 |
| 8,096,606 | B2 * | 1/2012 | Hanaki | E05D 15/101 |
| | | | | 296/146.11 |
| 9,592,902 | B2 * | 3/2017 | Perkins | B64C 1/1423 |
| 9,902,485 | B2 * | 2/2018 | Barmichev | B64C 1/24 |
| 10,538,304 | B2 * | 1/2020 | Erben | E05B 15/0086 |

FOREIGN PATENT DOCUMENTS

| | | | |
|---|---|---|---|
| FR | 2764254 | A1 | 12/1998 |
| KR | 20140042173 | A | 4/2014 |
| RU | 1827973 | A1 | 12/1995 |

OTHER PUBLICATIONS

European Search Report for EP 17400039, Completed by the European Patent Office, dated Nov. 20, 2017, All together 7 Pages.

\* cited by examiner

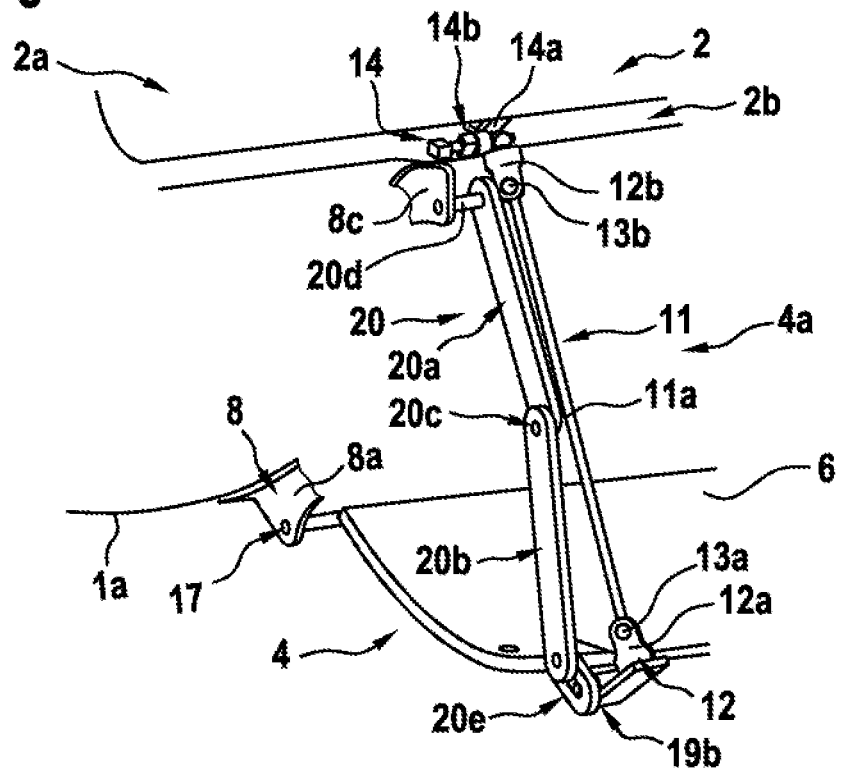
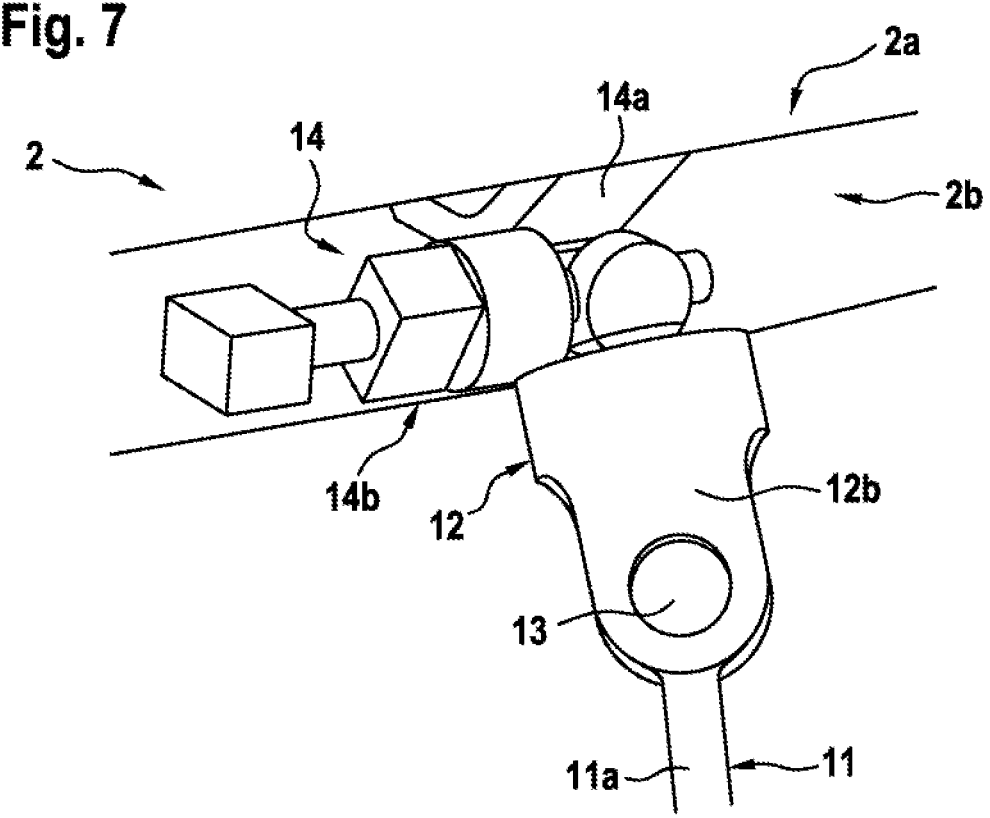

VEHICLE WITH A FOLDABLE FAIRING INTEGRATED FOOTSTEP UNIT

CROSS-REFERENCE TO RELATED APPLICATIONS

This application claims priority to European patent application No. EP 17400039.8 filed on Jun. 15, 2017, the disclosure of which is incorporated in its entirety by reference herein.

BACKGROUND OF THE INVENTION

(1) Field of the Invention

The present invention relates to a vehicle with a fairing and a sliding door that is glidingly mounted to the vehicle, wherein the sliding door is associated with a foldable fairing integrated footstep unit.

2) Description of Related Art

In general, integrated footstep units are provided on vehicles having a ground clearance that would make embarking on or descending from the vehicles without the integrated footstep units difficult and uncomfortable. More particularly, such integrated footstep units are specifically useful on vehicles with a comparatively high ground clearance, such as sports utility vehicles, off-road vehicles or rotary wing aircrafts.

Such integrated footstep units can be embodied as fixed footstep units that are attached to a respective vehicle frame. However, while such fixed footstep units render entering or leaving of a given vehicle easy and comfortable and, thus, participate in solving an underlying embarking or descending problem, these fixed footstep units attract and increase drag and, thus, significantly degrade a respective aerodynamic performance of the given vehicle in operation. Furthermore, such fixed footstep units are usually heavy with many fixed parts associated therewith.

In order to avoid or at least reduce degrading the respective aerodynamic performance of the given vehicle in operation, a given integrated footstep unit can be accommodated completely within an associated housing. Such an associated housing may then e. g. be arranged in a respective subfloor structure of a given vehicle and a stepping element, such as e. g. a stepping board of the integrated footstep unit, can be extended glidingly from the associated housing for use, and likewise retracted glidingly into the associated housing otherwise.

By way of example, the document KR 2014/0042173 A describes such an integrated footstep unit with a stepping element that is glidingly extendible from or retractable into an associated housing that is arranged in a respective subfloor structure of a land vehicle, in particular of a bus. Furthermore, the document EP 1 413 484 A1 describes an integrated footstep unit with a stepping element that is glidingly extendible from or retractable into an associated housing that is arranged in a respective subfloor structure of a commercial or recreational land vehicle.

In both cases, a respective stepping element is glidingly extendible from or retractable into the associated housing via movement of a sliding door. More specifically, during gliding of the sliding door from a closed-door position into an opened-door position, the respective stepping element is glidingly extended by means of an associated mechanical linkage from a retracted position inside of the associated housing into an extended position outside of the associated housing that allows its use. If the sliding door is then slid back from the opened-door position into the closed-door position, the respective stepping element is glidingly retracted by means of the associated mechanical linkage from the extended position outside of the associated housing back into its retracted position inside of the associated housing.

An alternative is described in the document FR 2 764 254 A1 that relates to an integrated footstep unit of a land vehicle, such as a van, which includes a stepping element that is pivotally extendible or retractable between a retracted position and an extended position via movement of a sliding door. In its retracted position, the stepping element is arranged below a respective floor structure of the van. However, the stepping element is not retractable into an associated housing, but remains unprotected and accessible from the ground side. Thus, this integrated footstep unit does not only attract and increase drag and, thus, significantly degrade a respective aerodynamic performance of the van in operation, but it is further prone to damage and even destruction due to its unprotected retracted position.

While the above-described applications of the integrated footstep units are all relating to land vehicles, other applications of such integrated footstep units are also possible. For instance, such integrated footstep units with a stepping element that is glidingly or pivotally extendible from or retractable into an associated housing may also be used with aircrafts.

By way of example, in a rotary wing aircraft such an associated housing may e. g. be arranged in a respective subfloor structure of the rotary wing aircraft, i. e. inside of a respective airframe of the rotary wing aircraft. However, due to the presence of cables or pipework in the respective subfloor structure, the associated housing may project slightly from the respective airframe. Furthermore, if extension or retraction of the stepping element of the integrated footstep unit is power driven, a respective power drive and system that uses e. g. a pressurized fluid is usually also arranged inside of the associated housing. Therefore, the stepping element of the integrated footstep unit and the respective power drive and system require a comparatively bulky housing.

By way of example, the document US D 287 714 S1 describes such an integrated footstep unit with a comparatively bulky housing that projects from a respective airframe of an associated rotary wing aircraft. However, use of the integrated footstep unit together with a sliding door is not described. Nevertheless, the bulky housing significantly increases drag and degrades a respective aerodynamic performance of the rotary wing aircraft in operation.

Alternatively, such integrated footstep units are implemented as foldable fairing integrated footstep units in order to minimize a respective drag thereof in operation of the vehicle. However, power driven foldable fairing integrated footstep units with several stages are complex with numerous linkages and power penalty to be operated. Thus, cost and weight of such foldable fairing integrated footstep units are significantly increased with respect to the above-described conventional integrated footstep units with an additional requirement of separate drive systems.

By way of example, the document U.S. Pat. No. 4,440,364 A describes such a foldable fairing integrated footstep unit that is driven by means of a compact motor and drive linkage arrangement and provided for an aircraft. However, use of the foldable fairing integrated footstep unit together with a sliding door is not described. Furthermore, this foldable fairing integrated footstep unit projects from a respective airframe of the aircraft and, thus, increases drag and degrades a respective aerodynamic performance of the aircraft in operation.

In contrast to the above-described foldable fairing integrated footstep units, the document SU 1 827 973 A1 describes a foldable fairing integrated footstep unit for an aircraft that comprises a stepping element that is foldable to be arranged in retracted position in a fairing of the aircraft without projecting therefrom. However, use of this foldable fairing integrated footstep unit together with a sliding door is not described. Furthermore, there is no indication on how to extend or retract the foldable fairing integrated footstep unit resp. its stepping element from or into the fairing of the aircraft.

The documents U.S. Pat. Nos. 6,189,833 and 4,440,364 have also been considered.

BRIEF SUMMARY OF THE INVENTION

It is, therefore, an object of the present invention to provide a new aircraft and, more generally, a new vehicle with a sliding door and a foldable fairing integrated footstep unit that is associated with the sliding door. This object is solved by a vehicle having the features of claim 1.

More specifically, according to the present invention a vehicle with a fairing and a sliding door that is glidingly mounted to the vehicle is provided. The sliding door is associated with a foldable fairing integrated footstep unit that comprises an outer shell and an unfolding/folding unit. The outer shell is integrated into the fairing of the vehicle and comprises an exterior surface that creates in closed state of the foldable fairing integrated footstep unit an at least approximately continuous aerodynamic surface with the fairing. The unfolding/folding unit connects the outer shell to the vehicle and is provided for unfolding the foldable fairing integrated footstep unit into an opened state during an opening gliding movement of the sliding door and for folding the foldable fairing integrated footstep unit into the closed state during a closing gliding movement of the sliding door.

The foldable fairing integrated footstep unit is particularly provided for use by passengers of the inventive vehicle in order to enable an easy and comfortable embarking on or descending from the vehicle. By way of example, the inventive vehicle may be an aircraft, such as a rotary wing aircraft, or a land vehicle, such as an off-road type vehicle, a sports utility vehicle, an automobile, a bus, a van or a truck. The inventive foldable fairing integrated footstep unit is, however, particularly suitable for vehicles having a comparatively high ground clearance.

In general, the foldable fairing integrated footstep unit provides improved performance at a fraction of weight and cost of comparable conventional integrated footstep units, potentially leading to higher efficiency and competitiveness. Furthermore, it leads to an additional value creation for improved customer satisfaction by providing enhanced aesthetics and functionality.

Advantageously, the foldable fairing integrated footstep unit is associated with a sliding door of the inventive vehicle and secured in opened and closed states by means of the sliding door. More specifically, opening or closing of the sliding door by means of gliding the sliding door along its primary gliding axis preferably respectively leads to unfolding or folding of the foldable fairing integrated footstep unit from or into an associated housing.

According to one aspect, the foldable fairing integrated footstep unit is very simple to operate by means of the sliding door, i. e. it is self-driven by the sliding door, and there is no need for use of complex power-driven systems, so that it is very easy to maintain. Furthermore, a comparatively simple and lightweight unfolding/folding unit can advantageously be implemented with reduced complex moving linkages. Advantageously, the elimination of the complex power-driven systems creates additionally available space and the flat surface in the foldable fairing integrated footstep unit in closed state provides in case of a rotary wing aircraft sufficient space for lifesaving emergency systems to be assembled within a respective subfloor region of the rotary wing aircraft.

Preferably, the foldable fairing integrated footstep unit is ejectable/detachable. This is particularly beneficial when using the foldable fairing integrated footstep unit in a rotary wing aircraft, as this allows in case of emergency situations to free the passage e. g. for emergency lifesaving systems that are deployable and required for evacuating passengers safely.

Advantageously, in the closed state of the foldable fairing integrated footstep unit its outer shell acts as a closing cover of the associated housing and, accordingly, closes the latter, preferably in a sealing manner. As the outer shell moreover creates an at least approximately continuous aerodynamic surface with the fairing of the vehicle in the closed state of the foldable fairing integrated footstep unit, the latter does not lead to any additional drag and, consequently, does not degrade the aerodynamic performances of the vehicle.

According to one aspect, the foldable fairing integrated footstep unit is confined in the associated housing in the closed state, e. g. by means of locking latches. Thus, any undesired and untimely opening of the foldable fairing integrated footstep unit can be avoided safely and reliably.

Preferably, the associated housing is completely accommodated inside of the fairing. In case of a rotary wing aircraft, the housing is preferentially completely accommodated in the fuselage of the rotary wing aircraft, thereby providing the least drag resistance and downwash possible. This will reduce a weight penalty induced by an equivalent conventional fixed footstep unit of about 80%.

According to one aspect, at least the outer shell comprises a sandwich composite laminate that is strengthened with a honeycomb core to provide a required stiffness with inertia. Thus, use of a conventional metal step can advantageously be avoided, thereby allowing a weight reduction of up to 70%. With respect to a rotary wing aircraft, such a weight reduction enables a total overall weight saving of up to 20 kg. Accordingly, not only weight can be reduced, but also correlated costs as well as an otherwise required complexity incurred with power or additional power-driven foldable steps.

In a preferred realization, the foldable fairing integrated footstep unit is provided as an integral part of a rotary wing aircraft having a sliding door, preferentially a sliding cabin door. In this realization, the foldable fairing integrated footstep unit is preferably hinged to a bottom fairing bracket and supported by left and right sliding links that are secured to the bottom fairing bracket. Preferably, the foldable fairing integrated footstep unit comprises a guiding strut with frictionless bearings hinged together with couplers at both ends, and a guided slider is arranged on a left free end and slides in the slider link that is respectively hinged to the foldable fairing integrated footstep unit via a pivot pin. Associated drive means for the foldable fairing integrated footstep unit are connected to the sliding door via another coupler and are together with the pin and the door slider retractable into and extendible from the rotary wing aircraft upon a gliding movement of the sliding cabin door.

According to a preferred embodiment, a housing is provided, the housing being adapted for accommodating the foldable fairing integrated footstep unit in the closed state such that the exterior surface of the outer shell creates the at least approximately continuous aerodynamic surface with the fairing.

According to a further preferred embodiment, the unfolding/folding unit comprises a sliding mechanism that is adapted for being engaged by the sliding door at least during the opening gliding movement and the closing gliding movement of the sliding door, and a guiding link that connects the outer shell to the sliding mechanism.

According to a further preferred embodiment, a door rail is provided, and the sliding door and the sliding mechanism are glidingly mounted to the door rail.

According to a further preferred embodiment, the sliding door comprises at least one sliding mechanism support that is adapted for engaging the sliding mechanism at least during the opening gliding movement and the closing gliding movement of the sliding door.

According to a further preferred embodiment, the guiding link comprises at least one rigid strut.

According to a further preferred embodiment, the unfolding/folding unit further comprises at least two couplers. A first coupler is preferably provided for rotatably coupling the at least one rigid strut to the outer shell, and a second coupler is preferably provided for rotatably coupling the at least one rigid strut to the sliding mechanism.

According to a further preferred embodiment, the foldable fairing integrated footstep unit further comprises at least one slider link that is adapted for limiting an opening rotation of the outer shell during the opening gliding movement of the sliding door.

According to a further preferred embodiment, at least one bracket is provided. The at least one bracket is preferably rigidly attached to the vehicle. The at least one slider link is preferably rotatably mounted to the at least one bracket and comprises a pin guide that glidingly accommodates an associated slide pin provided at the outer shell.

According to a further preferred embodiment, the foldable fairing integrated footstep unit further comprises at least one cable connection that is adapted for limiting an opening rotation of the outer shell during the opening gliding movement of the sliding door.

According to a further preferred embodiment, the at least one cable connection comprises a cable that is attached to the outer shell and connected to a cable socket that is accommodated in the vehicle for retracting the cable during the closing gliding movement of the sliding door.

According to a further preferred embodiment, the foldable fairing integrated footstep unit further comprises at least one double arm connection that is adapted for limiting an opening rotation of the outer shell during the opening gliding movement of the sliding door.

According to a further preferred embodiment, at least one bracket is provided. The at least one bracket is preferably rigidly attached to the vehicle. The at least one double arm connection preferably comprises a first arm that is rotatably mounted to the at least one bracket and a second arm that glidingly accommodates an associated slide pin provided at the outer shell. The first arm is preferably rotatably mounted to the second arm.

According to a further preferred embodiment, the foldable fairing integrated footstep unit further comprises an extendible stepping element that is accommodated in the outer shell in the closed state of the foldable fairing integrated footstep unit and that protrudes from the outer shell in opened state of the foldable fairing integrated footstep unit.

According to a further preferred embodiment, the foldable fairing integrated footstep unit further comprises a spring-loaded link that is provided for moving the extendible stepping element during the opening gliding movement of the sliding door such that the extendible stepping element protrudes from the outer shell in opened state of the foldable fairing integrated footstep unit.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

FIG. 6 shows a second variant of the enlarged detail of FIG. 4, FIG. 7 shows a perspective view of a sliding mechanism according to the present invention.

DETAILED DESCRIPTION OF THE INVENTION

Figure 1:
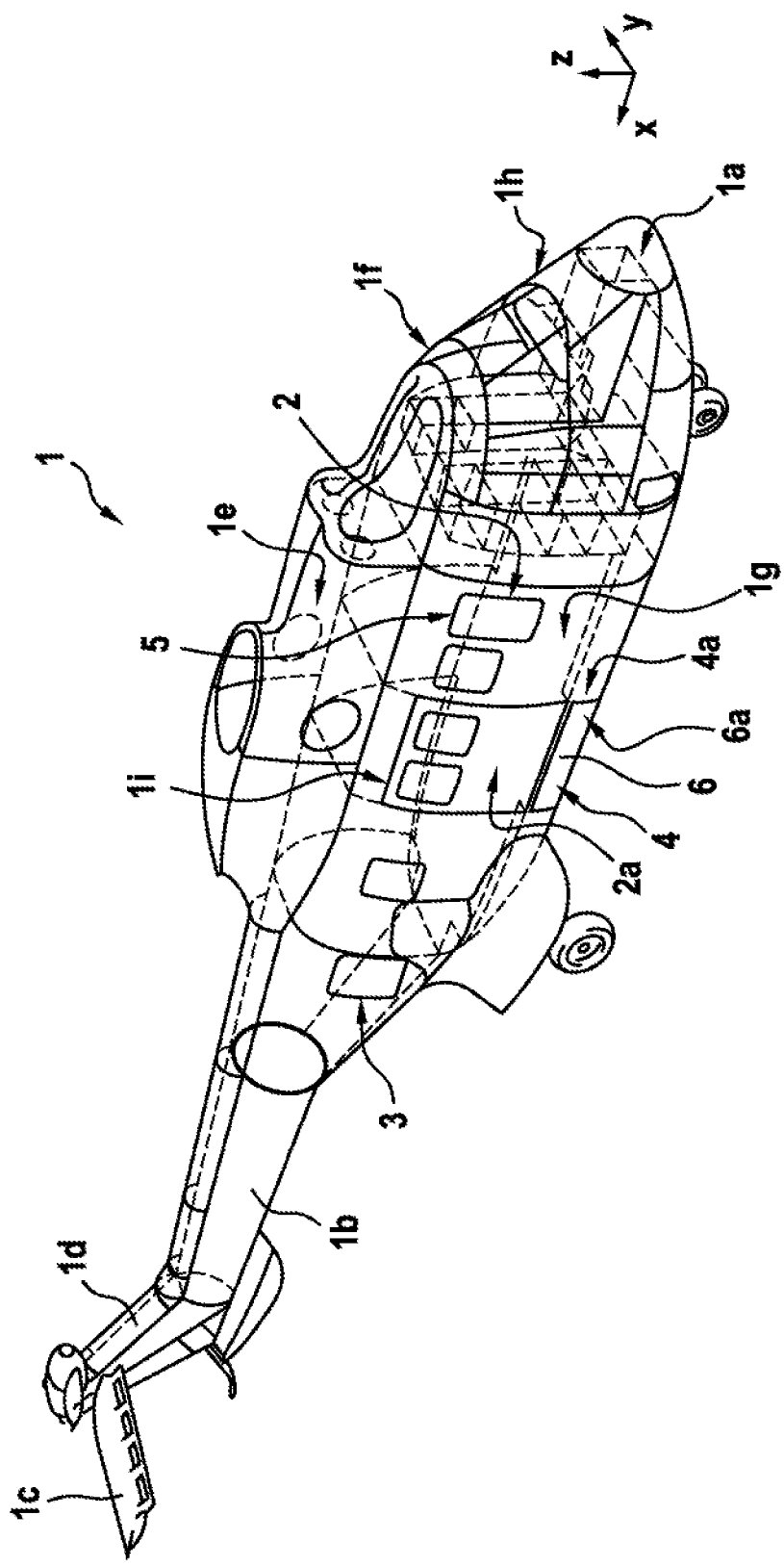
FIG. 1 shows a simplified perspective view of a rotary wing aircraft with a fuselage, a sliding door and a foldable fairing integrated footstep unit according to the present invention.

FIG. 1 shows a rotary wing aircraft 1 with at least one sliding door 2a and at least one foldable fairing integrated footstep unit 4. The rotary wing aircraft 1 is exemplarily illustrated as a helicopter. Thus, for purposes of simplicity and clarity, the rotary wing aircraft 1 is hereinafter referred to as the "helicopter" 1.

The present invention is, however, not limited to helicopters and can likewise be applied to any other vehicle, in particular to a vehicle that can be equipped with the at least one foldable fairing integrated footstep unit 4, independent of a particular configuration thereof. In other words, the present invention can be used with other aircrafts as well as with other vehicles in general, such as e. g. land vehicles like off-road type vehicles, sports utility vehicles, automobiles, busses, vans and/or trucks.

Illustratively, the helicopter 1 comprises an airframe 1*a*, which is also referred to as the "fuselage 1*a*" hereinafter. The fuselage 1*a* defines a tail boom 1*b*, which exemplarily comprises a tail wing 1*c* and a fin 1*d*. The tail boom 1*b* may further be provided e. g. with a horizontal stabilizer, a bumper and so on.

It should be noted that only the fuselage 1*a* with the tail boom 1*b* are shown in FIG. 1 for purposes of simplicity and clarity of the drawings. However, other conventional components, such as e. g. a main rotor or a tail rotor of the helicopter 1, are not shown, as they are well-known to the person skilled in the art and not part of the present invention and would, thus, only unnecessarily encumber and complicate the representation.

Illustratively, the fuselage 1*a* comprises at least two longitudinal side walls, a board side wall resp. lateral fairing 1*g*, which is also referred to hereinafter as the "board side lateral fairing 1*g*", and a starboard side wall resp. lateral fairing 1*h*, which is also referred to hereinafter as the "starboard side lateral fairing 1*h*". The board side lateral fairing 1*g* and the starboard side lateral fairing 1*h* are exemplarily equipped with a plurality of doors and/or windows 2, a plurality of maintenance traps 3 and a plurality of emergency exits 5, which are e. g. at least partly defined by the plurality of doors and/or windows 2.

The fuselage 1*a* illustratively further comprises a fairing 1*f* that exemplarily includes the board side lateral fairing 1*g* and the starboard side lateral fairing 1*h*. The fairing 1*f* preferably defines at least a drive system accommodating region 1*e* and a cockpit, and may further define a passenger cabin and/or a cargo compartment. However, for simplicity and clarity of the description, such a cockpit, passenger cabin and cargo compartment are not explained in greater detail.

The drive system accommodating region 1*e* preferably accommodates one or more engines that are adapted for driving the helicopter 1, e. g. by providing power to an associated power distribution unit, such as a gearbox, which then provides this power to a suitable propelling unit, such as e. g. a propeller, rotor or other. Preferably, the one or more engines are embodied as air breathing propulsion engines, such as diesel engines, gas engines, gas turbines and so on, which combust a fuel/air mix for power generation. However, as the air breathing propulsion engines as such are not part of the present invention, they are not explained in greater detail for brevity and conciseness.

According to one aspect of the present invention, the plurality of doors and/or windows 2 includes the at least one sliding door 2*a* that is illustratively embodied for closing, if required, an associated aperture 1*i* provided in the fuselage 1*a*. By way of example, the at least one sliding door 2*a* is mounted to the board side lateral fairing 1*g* of the helicopter 1. The at least one sliding door 2*a* is preferably glidingly mounted to the helicopter 1 and, preferentially, associated with the foldable fairing integrated footstep unit 4.

Preferably, the foldable fairing integrated footstep unit 4 comprises a housing 4*a* that is accommodated in the fairing 1*f*, resp. the fuselage 1*a*. According to one aspect, the foldable fairing integrated footstep unit 4 further comprises an outer shell 6 that is integrated into the fairing 1*f* of the helicopter 1. More specifically, the outer shell 6 preferably comprises an exterior surface 6*a* that creates in closed state of the foldable fairing integrated footstep unit 4 an at least approximately continuous aerodynamic surface with the fairing 1*f*. According to one aspect, the housing 4*a* is adapted for accommodating the foldable fairing integrated footstep unit 4 in the closed state such that the exterior surface 6*a* of the outer shell 6 creates the at least approximately continuous aerodynamic surface with the fairing 1*f*.

Figure 2:
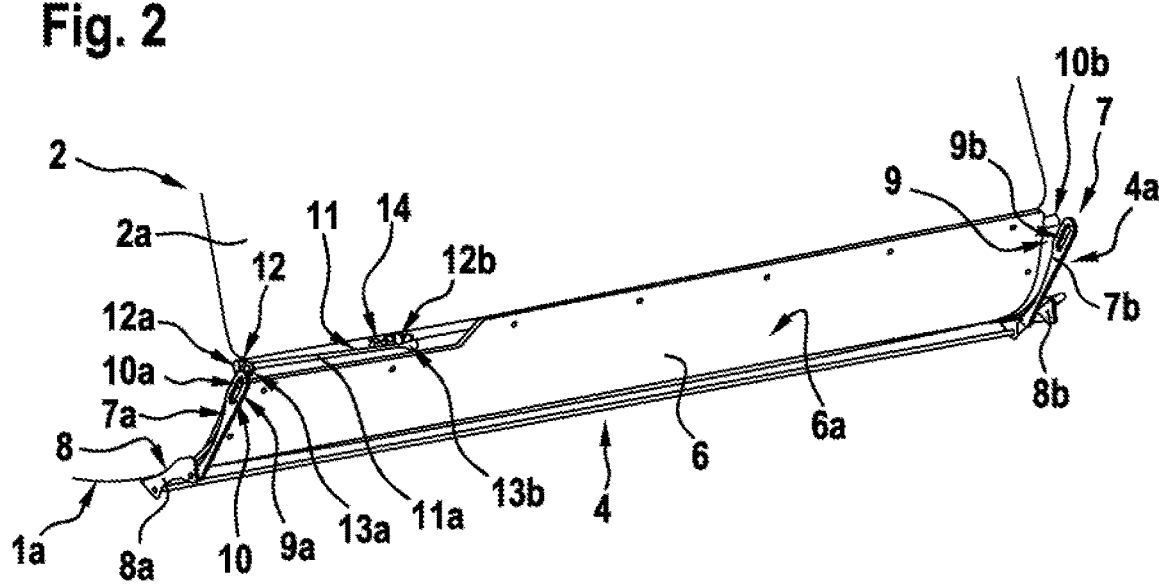
FIG. 2 shows an enlarged detail of the foldable fairing integrated footstep unit of FIG. 1 in closed state.

FIG. 2 shows the fuselage 1*a* of the helicopter 1 of FIG. 1, as well as the sliding door 2*a* of FIG. 1 and the foldable fairing integrated footstep unit 4 of FIG. 1 that comprises the outer shell 6 which is integrated into the fairing 1*f* of the helicopter 1 of FIG. 1. The foldable fairing integrated footstep unit 4 is exemplarily illustrated in the closed state, wherein the exterior surface 6*a* of the outer shell 6 creates an at least approximately continuous aerodynamic surface with the fairing 1*f*.

Figure 3:
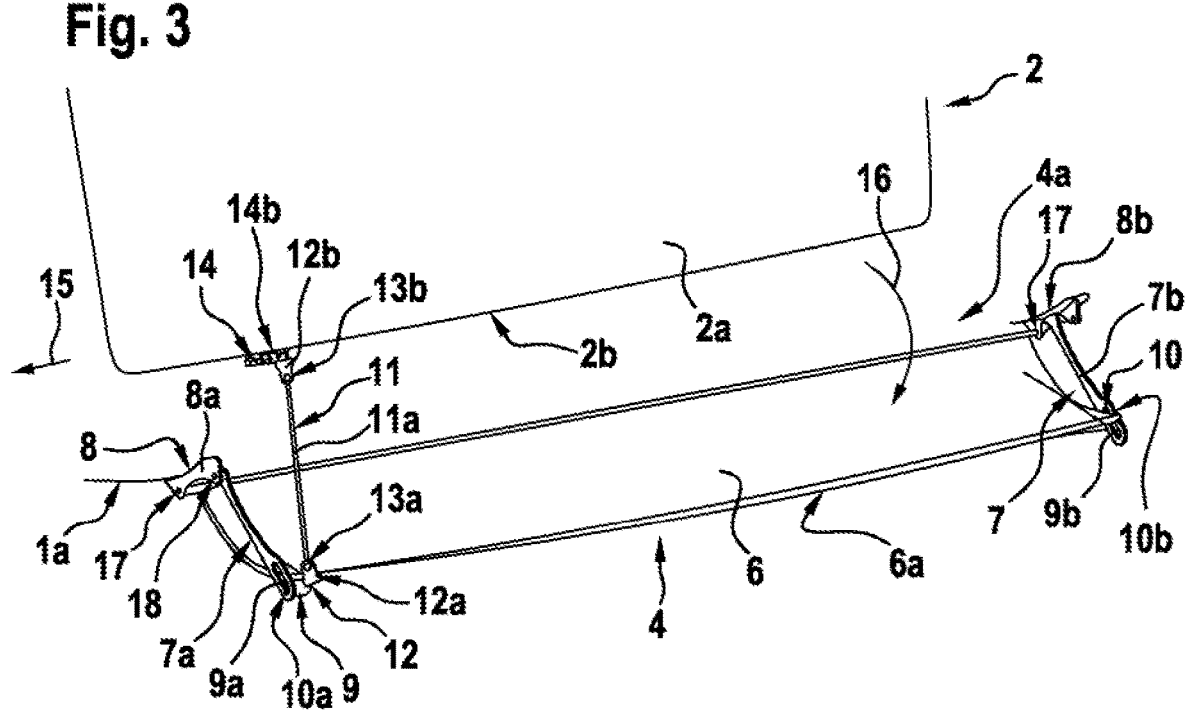
FIG. 3 shows an enlarged detail of the foldable fairing integrated footstep unit of FIG. 1 in opened state.

More specifically, the closed state of the foldable fairing integrated footstep unit 4 preferably corresponds to a folded position of the outer shell 6, as illustrated in FIG. 2. In contrast thereto, an opened state of the foldable fairing integrated footstep unit 4 preferably corresponds to an unfolded position of the outer shell 6, as illustrated in FIG. 3. According to one aspect, the outer shell 6 can be moved from the folded position to the unfolded position by means of an opening rotation around an associated hinge, as described below at FIG. 3. Likewise, the outer shell 6 can be moved from the unfolded position to the folded position by means of a closing rotation around the associated hinge.

Preferably, the foldable fairing integrated footstep unit 4 comprises one or more slider links 7 that are adapted for limiting the opening rotation of the outer shell 6 during an opening gliding movement of the sliding door 2*a*. A respectively selected number of slider links can preferentially be selected in an application-specific manner. For instance, if an axial length of the outer shell 6 is comparatively short, a single slider link may be sufficient.

By way of example, two slider links 7 are provided. Illustratively, a first slider link 7*a* is arranged on a left-hand side of the outer shell 6 and a second slider link 7*b* is arranged on a right-hand side of the outer shell 6. However, it should be noted that the second slider link 7*b* is shown as being detached from the outer shell 6 for a better illustration thereof.

According to one aspect, each one of the slider links 7 is rotatably mounted, i. e. mounted in a rotatable manner, to an associated one of a predetermined number of provided brackets 8 that are rigidly attached to the helicopter 1 of FIG. 1 and, more specifically, to the fuselage 1*a*. By way of example, each one of the first and second slider links 7*a*, 7*b* is rotatably mounted to an associated bracket 8*a*, 8*b*. Accordingly, the bracket 8*a* is illustratively arranged on the left-hand side of the outer shell 6 and the bracket 8*b* is illustratively arranged on the right-hand side of the outer shell 6.

Preferably, the slider links 7 are provided with respective slide pin guides 9. Illustratively, the first slider link 7*a* is provided with a slide pin guide 9*a* and the second slider link 7*b* is provided with a slide pin guide 9*b*. The slide pin guides 9*a*, 9*b* preferentially glidingly accommodate associated slide pins 10 provided at the outer shell 6. Illustratively, the slide pin guide 9a glidingly accommodates an associated slide pin 10a and the slide pin guide 9b glidingly accommodates an associated slide pin 10b. The slide pins 10a, 10b preferably slide in the slide pin guides 9a, 9b during the opening rotation of the outer shell 6, when the latter is moved from the folded position to the unfolded position, such that the foldable fairing integrated footstep unit 4 is unfolded from its closed state into its opened state.

According to one aspect, the foldable fairing integrated footstep unit 4 further comprises an unfolding/folding unit that connects the outer shell 6 to the helicopter 1 of FIG. 1 and, more specifically, to the fuselage 1a. The unfolding/folding unit is preferably provided for unfolding the foldable fairing integrated footstep unit 4 into the opened state during the opening gliding movement of the sliding door 2a and for folding the foldable fairing integrated footstep unit 4 into the closed state during a closing gliding movement of the sliding door 2a. Illustratively, the unfolding/folding unit comprises a guiding link 11, at least two couplers 12, one or more pivot pins 13a, 13b, and a sliding mechanism 14.

The guiding link 11 preferably comprises at least one and, illustratively, one rigid strut 11a. The guiding link 11 and, more specifically, the rigid strut 11a connects the outer shell 6 to the sliding mechanism 14.

The at least two couplers 12 illustratively comprise a first coupler 12a and a second coupler 12b. The first coupler 12a preferably couples the rigid strut 11a rotatably to the outer shell 6. The second coupler 12b preferably couples the rigid strut 11a rotatably to the sliding mechanism 14.

The one or more pivot pins 13a, 13b preferably couple the rigid strut 11a pivotally to the first and second couplers 12a, 12b. Illustratively, a first pivot pin 13a couples the rigid strut 11a pivotally to the first coupler 12a and a second pivot pin 13b couples the rigid strut 11a pivotally to the second coupler 12b.

The sliding mechanism 14 is preferably adapted for being engaged by the sliding door 2a at least during the opening gliding movement and the closing gliding movement of the sliding door 2a. Thus, the sliding door 2a activates and, more specifically, preferably entrains the sliding mechanism 14 at least during the opening gliding movement and the closing gliding movement for unfolding or folding the foldable fairing integrated footstep unit 4.

According to one aspect, one or more and, preferably, three locking latches are provided for locking the foldable fairing integrated footstep unit 4 in the closed state. Thus, any untimely and/or undesired opening of the foldable fairing integrated footstep unit 4 can be avoided reliably. This likewise applies to the opened state, which may preferably similarly be locked. However, such locking latches are well-known to the person skilled in the art and are, therefore, not shown and described in more detail.

FIG. 3 shows the fuselage 1a and the sliding door 2a of FIG. 1 and FIG. 2, as well as the foldable fairing integrated footstep unit 4 of FIG. 1 and FIG. 2 with the unfolding/folding unit of FIG. 2 and the outer shell 6 of FIG. 1 and FIG. 2. The foldable fairing integrated footstep unit 4 is exemplarily illustrated in the opened state with the outer shell 6 in its unfolded position.

As described above with reference to FIG. 2, the foldable fairing integrated footstep unit 4 is unfolded from the closed state illustrated in FIG. 2 into the opened state during the opening gliding movement of the sliding door 2a. The opening gliding movement is exemplarily performed by moving the sliding door 2a starting from its closed position illustrated in FIG. 2 into an opening movement direction 15.

According to one aspect, the sliding door 2a is equipped with at least one sliding mechanism support 14a that is adapted for engaging the sliding mechanism 14 of FIG. 2 of the foldable fairing integrated footstep unit 4 at least during the opening gliding movement. Preferably, the at least one sliding mechanism support 14a is further adapted for engaging the sliding mechanism 14 during the closing gliding movement of the sliding door 2a, which may be performed by moving the sliding door 2a from its opened position into the closing movement direction, which is preferably the direction that is opposed to the opening movement direction 15, into its closed position illustrated in FIG. 2.

More specifically, during the opening gliding movement of the sliding door 2a, the sliding mechanism support 14a provided at the sliding door 2a preferably engages the sliding mechanism 14 and entrains resp. pushes the latter in the opening movement direction 15. Accordingly, the coupler 12b is also moved in the opening movement direction 15 such that the rigid strut 11a pivots around the pivot pin 13b which connects the rigid strut 11a to the coupler 12b. Simultaneously, the rigid strut 11a pivots around the pivot pin 13a which connects the rigid strut 11a to the coupler 12a that is mounted to the outer shell 6. Thus, the outer shell 6 is rotated in an unfolding direction 16 around an associated hinge 17 that is connected to the brackets 8a, 8b.

During a respective opening resp. unfolding rotation of the outer shell 6 in the unfolding direction 16, the slider links 7a, 7b simultaneously rotate in the unfolding direction 16 around a respectively associated hinge 18. This rotation of the slider links 7a, 7b is forced by the slide pins 10a, 10b which slide in the respective slide pin guides 9a, 9b.

According to one aspect, an underlying rotation angle of the outer shell 6 in the unfolding direction 16 is limited by the slider links 7a, 7b with the slide pin guides 9a, 9b and a respectively predefined length of the rigid strut 11a. Preferably, the slider links 7a, 7b are arranged at a predefined position at the brackets 8a, 8b and adjusted in height for a suitable limitation of the underlying rotation angle.

Figure 4:
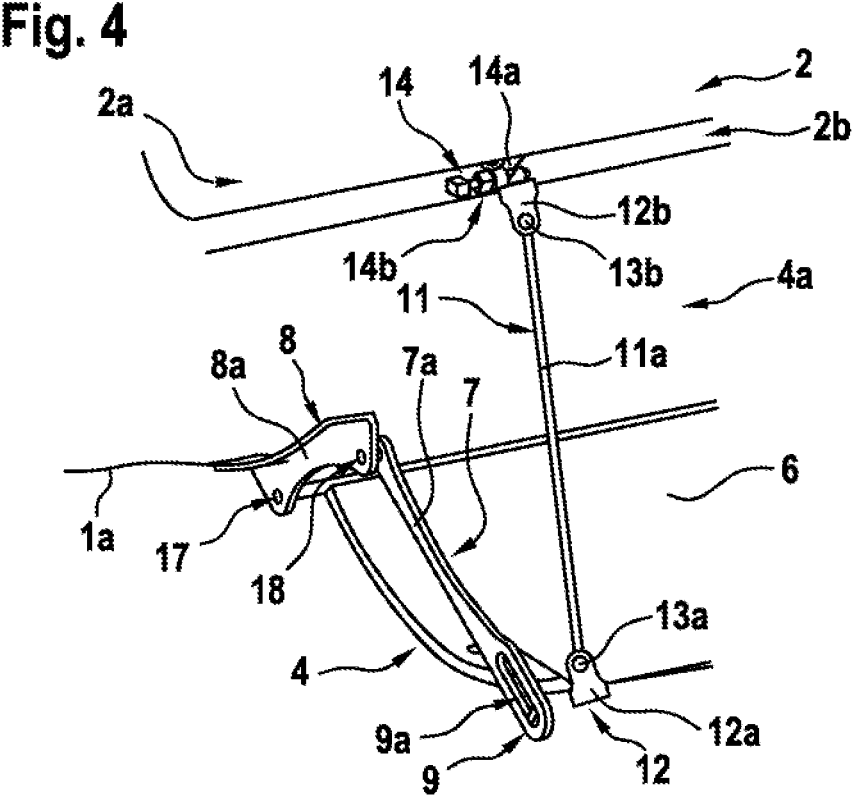
FIG. 4 shows a perspective view of a further enlarged detail of the foldable fairing integrated footstep unit of FIG. 3.

FIG. 4 shows the fuselage 1a and the sliding door 2a of FIG. 3, as well as the foldable fairing integrated footstep unit 4 of FIG. 3 with the outer shell 6, for further illustrating the unfolding/folding unit of FIG. 3. As described above, the unfolding/folding unit comprises the guiding link 11, the couplers 12, the pivot pins 13a, 13b, and the sliding mechanism 14.

According to one aspect, the sliding mechanism 14 is glidingly mounted to a door rail 2b. The latter is preferably embodied in the fuselage 1a. Likewise, the sliding door 2a is also glidingly mounted to the door rail 2b. In other words, both the sliding door 2a and the sliding mechanism 14 are glidingly mounted to the door rail 2b.

Preferably, the sliding mechanism 14 is equipped with a coupling mechanism 14b. The latter is preferentially provided for being engaged by the sliding mechanism support 14a of the sliding door 2a at least during the opening gliding movement and the closing gliding movement of the sliding door 2a such that the sliding door 2a may entrain the sliding mechanism 14 as required.

Figure 5:
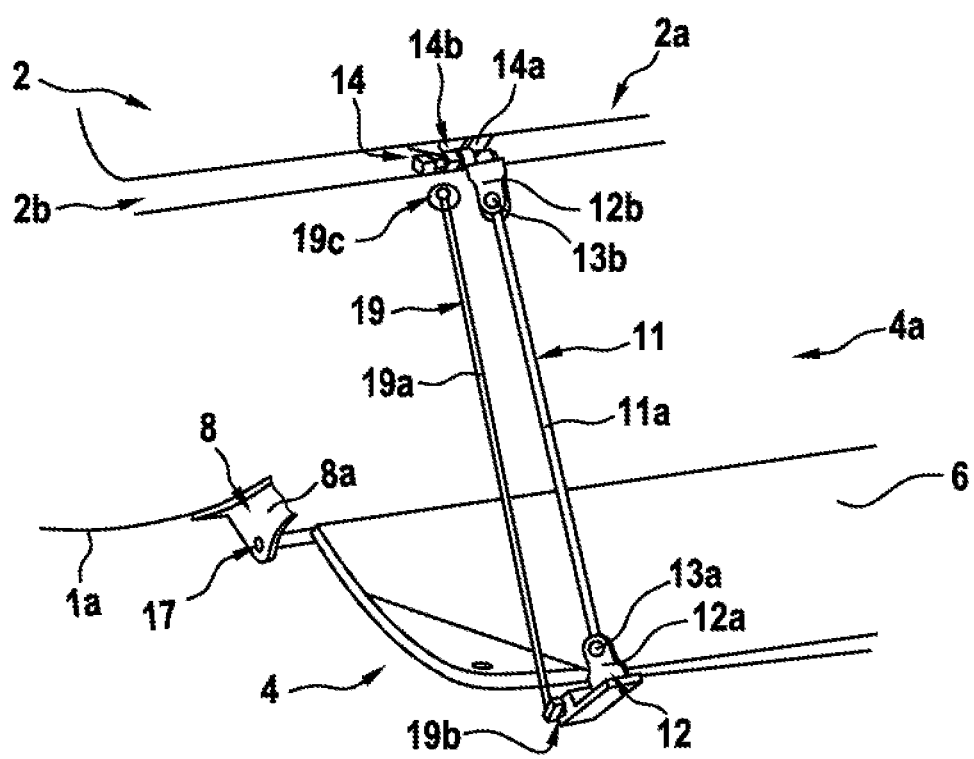
FIG. 5 shows a first variant of the enlarged detail of FIG. 4.

FIG. 5 shows the fuselage 1a and the sliding door 2a of FIG. 4, as well as the foldable fairing integrated footstep unit 4 of FIG. 4 with the outer shell 6. However, according to one aspect the foldable fairing integrated footstep unit 4 is now provided with at least one cable connection 19 instead of the slider links 7 of FIG. 4.

Preferably, the at least one cable connection 19 is adapted for limiting an opening resp. unfolding rotation of the outer shell 6 in the unfolding direction 16 of FIG. 3 during the opening gliding movement of the sliding door 2a in the opening movement direction 15 of FIG. 3. According to one aspect, the at least one cable connection 19 includes a cable 19a that is attached to the outer shell 6 by means of an associated cable connector 19b. Illustratively, the associated cable connector 19b is further rigidly attached to the coupler 12a.

Preferably, the cable 19a is further connected to a cable socket 19c. The latter is preferentially accommodated in the helicopter 1 of FIG. 1 resp. inside the fuselage 1a for retracting the cable 19a during the closing gliding movement of the sliding door 2a. Therefore, the cable socket 19c may be linked to a suitable cable winder that winds the cable 19a up during folding of the outer shell 6.

It should be noted that in FIG. 5 only a single cable connection 19 is illustrated. However, one or more additional cable connections may similarly be implemented. For instance, instead of each one of the slider links 7 of FIG. 2 and FIG. 3, a respective cable connection may be provided.

Furthermore, it should be noted that the brackets 8 of FIG. 2 and FIG. 3 can be adapted to use of the cable connection (s). In fact, as the hinged accommodation of the slider links 7 of FIG. 2 and FIG. 3 is no more required, the brackets 8 can advantageously be shortened, as illustrated by way of example with respect to the bracket 8a.

FIG. 6 shows the fuselage 1a and the sliding door 2a of FIG. 4, as well as the foldable fairing integrated footstep unit 4 of FIG. 4 with the outer shell 6. However, according to one aspect the foldable fairing integrated footstep unit 4 is now provided with at least one double arm connection 20 instead of the slider links 7 of FIG. 4.

Preferably, the at least one double arm connection 20 is adapted for limiting an opening resp. unfolding rotation of the outer shell 6 in the unfolding direction 16 of FIG. 3 during the opening gliding movement of the sliding door 2a in the opening movement direction 15 of FIG. 3. According to one aspect, the at least one double arm connection 20 includes a first arm 20a and a second arm 20b. The first arm 20a is rotatably mounted to the second arm 20b, preferentially by means of a suitable arm hinge 20c.

By way of example, the second arm 20b glidingly accommodates an associated slide pin which is exemplarily implemented by means of the associated cable connector 19b of FIG. 5 that is illustratively rigidly attached to the coupler 12a. According to one aspect, the second arm 20 is rotatably mounted to an arm connection hinge 20e that accommodates the slide pin. Alternatively, the second arm 20b or the arm connection hinge 20e may be connected to the slide pin 10a of FIG. 2 and FIG. 3.

Furthermore, according to one aspect, an additional bracket 8c is provided at the fuselage 1a and the first arm 20a is rotatably mounted to the additional bracket 8c. Preferably, this is achieved by means of a connection hinge 20d that rotatably connects the first arm 20a to the additional bracket 8c.

Finally, as described above with reference to FIG. 5, the bracket 8a is again shortened.

FIG. 7 shows the sliding door 2a of FIG. 4 to FIG. 6 and the sliding mechanism 14 of the unfolding/folding unit of the foldable fairing integrated footstep unit 4 of FIG. 4 to FIG. 6. Both, the sliding door 2a and the sliding mechanism 14 are glidingly accommodated in the door rail 2b of FIG. 4 to FIG. 6.

FIG. 7 further illustrates the sliding mechanism support 14a of the sliding door 2a and the coupling mechanism 14b of the sliding mechanism 14. As described above with reference to FIG. 4, the coupling mechanism 14b is preferentially provided for being engaged by the sliding mechanism support 14a at least during the opening gliding movement and the closing gliding movement of the sliding door 2a such that the sliding door 2a may entrain the sliding mechanism 14 as required.

However, it should be noted that a suitable coupling mechanism and, more generally, a suitable sliding mechanism for realization of the coupling mechanism 14b and the sliding mechanism are well-known to the person skilled in the art. However, a suitable coupling mechanism resp. a suitable sliding mechanism as such are not part of the present invention. Therefore, the coupling mechanism 14b and the sliding mechanism 14 are not further illustrated and described in the context of the present application.

Figure 8:
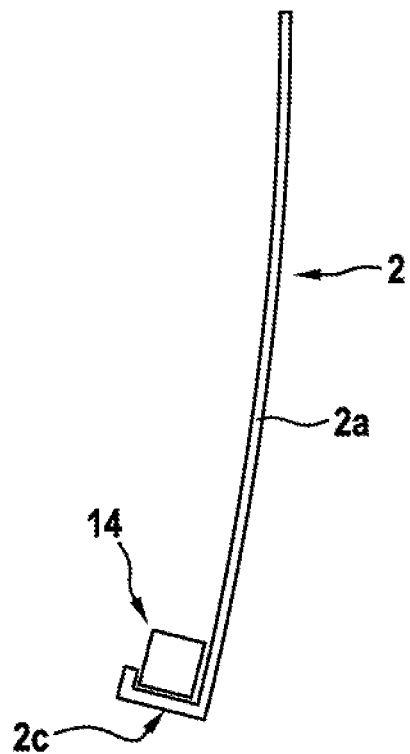
FIG. 8 shows a side view of the sliding mechanism of FIG. 7 with the sliding door of FIG. 1.

FIG. 8 shows the sliding door 2a of FIG. 4 to FIG. 7 and the sliding mechanism 14 of FIG. 4 to FIG. 7. Both, the sliding door 2a and the sliding mechanism 14 are glidingly accommodated in the door rail 2b of FIG. 4 to FIG. 7.

According to one aspect, the sliding door 2a is equipped with a lower sliding guide 2c that is, preferably, glidingly accommodated in the door rail 2b. Preferentially, the sliding mechanism 14 is glidingly accommodated in the lower sliding guide 2c.

Figure 9:
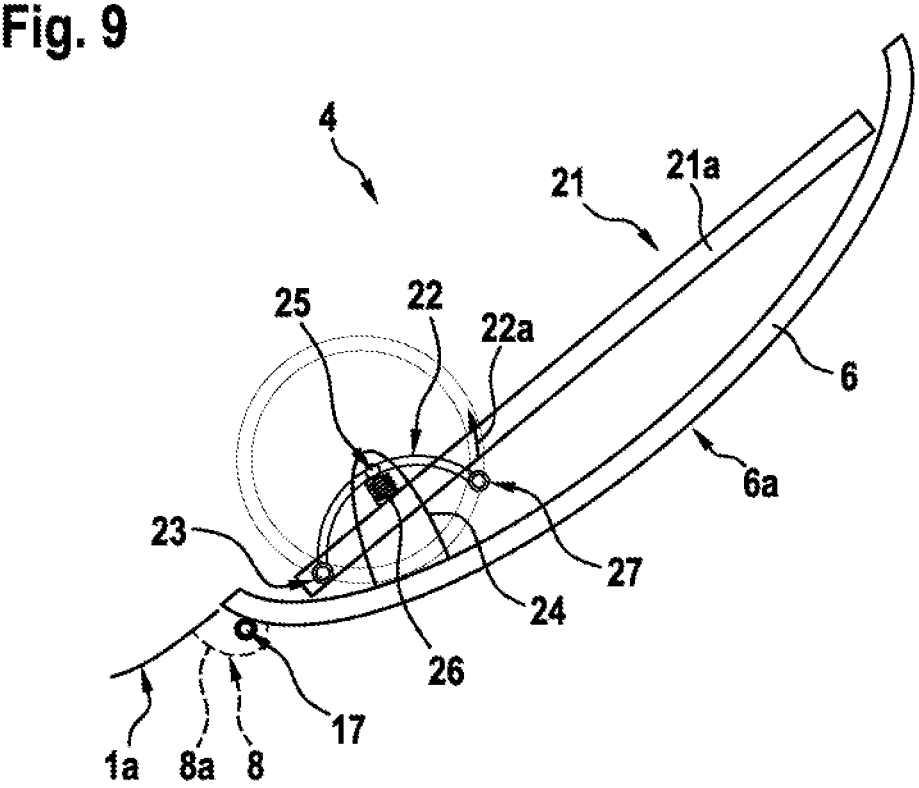
FIG. 9 shows a side view of the foldable fairing integrated footstep unit of FIG. 1 in closed state, with an extendible stepping element according to the present invention in retracted position.

FIG. 9 shows the fuselage 1a of the helicopter 1 of FIG. 1, as well as the foldable fairing integrated footstep unit 4 of FIG. 1 to FIG. 6 that comprises the outer shell 6. The foldable fairing integrated footstep unit 4 is again illustrated in the closed state according to FIG. 2. However, for simplicity and clarity of the drawings, illustration of the unfolding/folding unit according to FIG. 4 to FIG. 6 was omitted.

Figure 11:
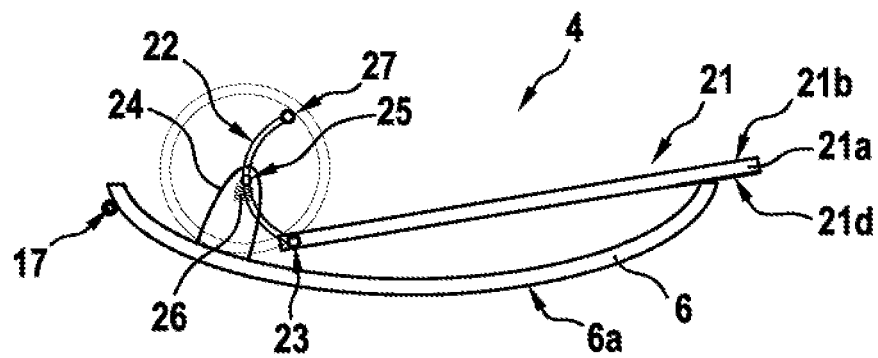
FIG. 11 shows a side view of the foldable fairing integrated footstep unit of FIG. 9 and FIG. 10 in opened state, with the extendible stepping element in extended position.

According to one aspect, the foldable fairing integrated footstep unit 4 is now further equipped with an extendible stepping element 21. The latter is preferably accommodated in the outer shell 6 in the closed state of the foldable fairing integrated footstep unit 4 and preferentially protrudes at least partly from the outer shell 6 in opened state of the foldable fairing integrated footstep unit 4, as illustrated in FIG. 11.

The extendible stepping element 21 is preferably equipped with an at least partly and, exemplarily, entirely flat stepping board 21a. This flat stepping board 21a is according to one aspect connected to the outer shell 6 via a spring-loaded link 22, while the outer shell 6 is rotatably mounted to the brackets 8 of FIG. 4 to FIG. 6 by means of the associated hinges 17 of FIG. 4 to FIG. 6. The spring-loaded link 22 is preferably provided for moving the extendible stepping element 21 and, more specifically, the flat stepping board 21a, during the opening gliding movement of the sliding door 2a such that the extendible stepping element 21 resp. the flat stepping board 21a protrudes from the outer shell 6 in opened state of the foldable fairing integrated footstep unit 4.

More specifically, according to one aspect the spring-loaded link 22 is pivotally mounted to the flat stepping board 21a by means of a rotatable connection 23. The spring-loaded link 22 is preferably further pivotally mounted to a bracket 24 that is rigidly mounted to the outer shell 6. The bracket 24 may be bonded, welded, riveted, screwed or otherwise rigidly attached to the outer shell 6, or alternatively be integrally formed with the outer shell 6, e. g. in one piece. Illustratively, the spring-loaded link 22 is pivotally mounted to a bracket 24, at least approximately at a central position of the bracket 24, by means of a rotatable connection 25.

Preferably, the spring-loaded link 22 is implemented by means of an arc-shaped carrier element. The latter is illustratively at least approximately semi-circular with one end that is located at the rotatable connection 23 and another opposed free end. The free end preferably implements or, alternatively, is provided with a movement limiter 27, which may e. g. be realized by a suitable gliding element or roller or a simple damper block, e. g. an elastomer damper.

According to one aspect, the spring-loaded link 22 is spring loaded by means of an associated spring element 26. The latter is illustratively realized by a—in FIG. 9—clockwise acting torsion spring that is secured to the bracket 24. Preferably, the associated spring element 26 preloads the movement limiter 27 in a stepping element extension direction 22a.

Figure 10:
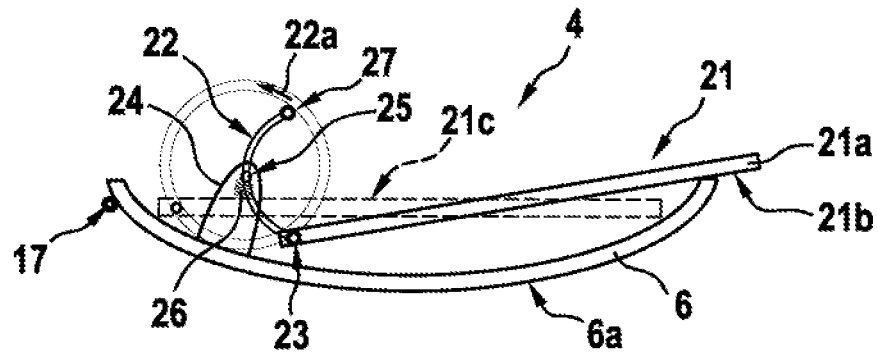
FIG. 10 shows the foldable fairing integrated footstep unit of FIG. 9 in opened state, with the extendible stepping element in retracted and extended position.

FIG. 10 shows the foldable fairing integrated footstep unit 4 of FIG. 9 with the outer shell 6 in the opened state according to FIG. 3. Again, for simplicity and clarity of the drawings, illustration of the unfolding/folding unit according to FIG. 4 to FIG. 6 was omitted.

Illustratively, the extendible stepping element 21 and, more specifically, the flat stepping board 21a is shown in continuous lines in extended status 21b, and in dotted lines in retracted status 21c as already illustrated in FIG. 9. The transition from the retracted status 21c to the extended status 21b is achieved by a pivotal movement of the spring-loaded link 22 around the rotatable connection 25 in the stepping element extension direction 22a, as a result of a respective preload applied by the associated spring element 26 to the spring-loaded link 22.

FIG. 11 shows the foldable fairing integrated footstep unit 4 of FIG. 10 with the outer shell 6 in the opened state according to FIG. 3. Again, for simplicity and clarity of the drawings, illustration of the unfolding/folding unit according to FIG. 4 to FIG. 6 was omitted. Furthermore, for simplicity and clarity of the drawings, the extendible stepping element 21 and, more specifically, the flat stepping board 21a is now only shown in the extended status 21b.

In contrast to FIG. 10, the flat stepping board 21a is now provided with a board sliding area 21d. The board sliding area 21d may be implemented by any component that is suitable to allow an at least essentially frictionless gliding of the flat stepping board 21a on the outer shell 6 in order to avoid excessive wear. By way of example, the board sliding area 21d may be implemented by means of, or at least be provided with, a polytetrafluoroethylene gliding component.

Figure 12:
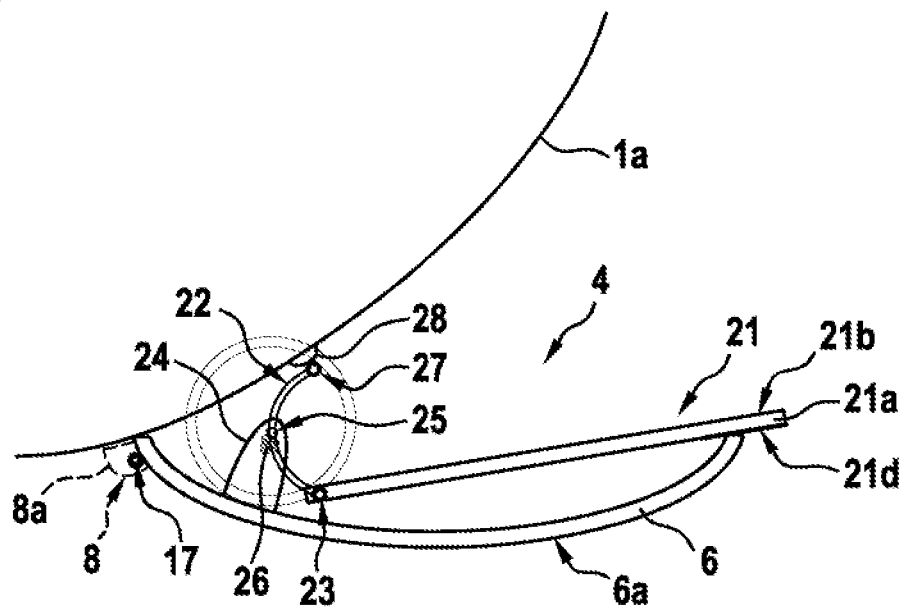
FIG. 12 shows a side view of the fuselage of FIG. 1 with the foldable fairing integrated footstep unit of FIG. 11.

FIG. 12 shows the foldable fairing integrated footstep unit 4 of FIG. 11 with the outer shell 6 in the opened state. However, in contrast to FIG. 11 the foldable fairing integrated footstep unit 4, which is again shown without the unfolding/folding unit of FIG. 4 to FIG. 6 for simplicity and clarity of the drawings, is now again shown mounted to the fuselage 1a of the helicopter 1 of FIG. 1, similar to FIG. 4 to FIG. 6.

According to one aspect, the fuselage 1a is now further provided with a stopper 28. The stopper 28 preferably serves as a limit stop for the movement limiter 27. More specifically, the stopper 28 is preferentially provided for blocking the pivotal movement of the spring-loaded link 22 around the rotatable connection 25 in the stepping element extension direction 22a of FIG. 10, if a predefined and exemplarily illustrated, maximum allowed opening angle of the foldable fairing integrated footstep unit 4 is reached in the opened state.

Figure 13:
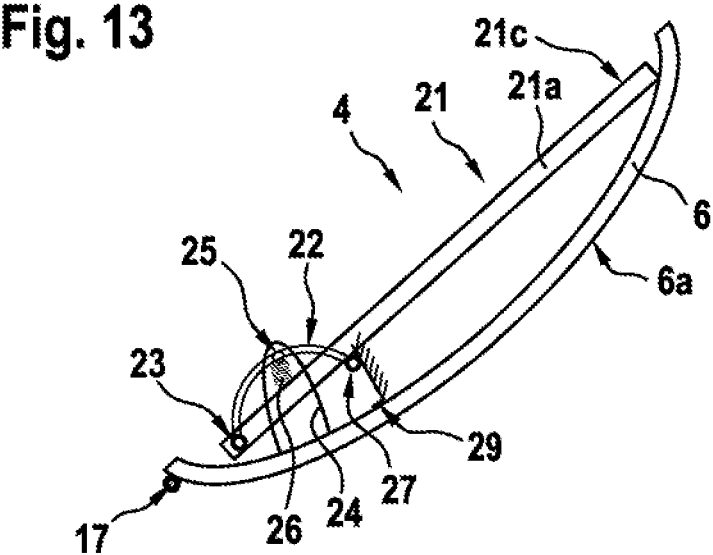
FIG. 13 shows a side view of the foldable fairing integrated footstep unit of FIG. 9 in closed state according to a variant.

FIG. 13 shows the foldable fairing integrated footstep unit 4 of FIG. 9 with the outer shell 6 in the closed state. However, in contrast to FIG. 11 the foldable fairing integrated footstep unit 4, which is again shown without the unfolding/folding unit of FIG. 4 to FIG. 6 for simplicity and clarity of the drawings, is now exemplarily shown with a movement limiting support 29. The movement limiting support 29 is preferably embodied by the fuselage 1a of the helicopter 1 of FIG. 1.

According to one aspect, the movement limiting support 29 serves as a limit stop for the movement limiter 27. More specifically, the movement limiting support 29 is preferably provided for blocking the pivotal movement of the spring-loaded link 22 around the rotatable connection 25 in the stepping element extension direction 22a of FIG. 9, if a predefined, maximum allowed opening angle of the foldable fairing integrated footstep unit 4 is reached in the opened state.

It should be noted that a respective movement behavior of the flat stepping board 21a, e. g. faster, slower and so on, as well as a respective end position of the flat stepping board 21a in its extended status can be adjusted by predetermining angle and shape of the movement limiting support 29 and length and shape, e. g. curvature, of the spring-loaded link 22.

Figure 14:
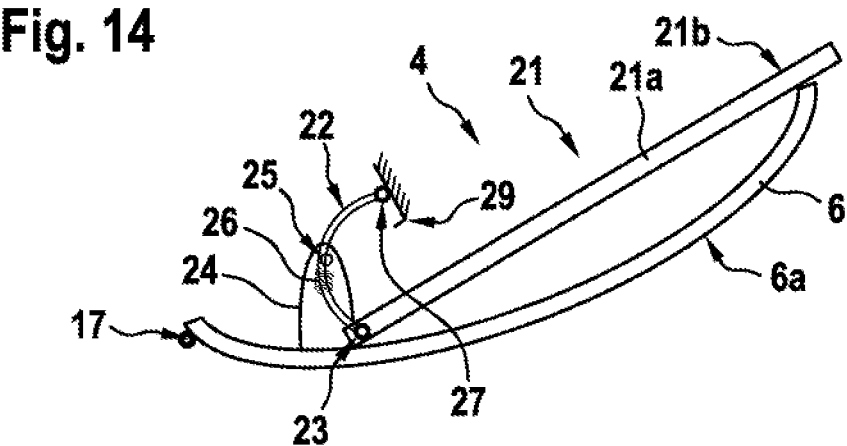
FIG. 14 shows a side view of the foldable fairing integrated footstep unit of FIG. 13 in an intermediate state.

FIG. 14 shows the foldable fairing integrated footstep unit 4 of FIG. 13 with the outer shell 6 in an intermediate state. In this intermediate state, the flat stepping board 21a is almost in its extended status. However, the movement limiter 27 may still be moved relative to the movement limiting support 29.

Figure 15:
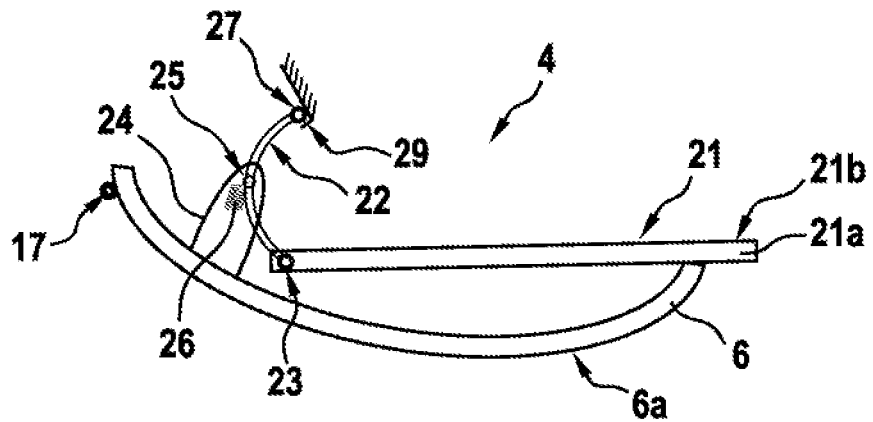
FIG. 15 shows a side view of the foldable fairing integrated footstep unit of FIG. 13 in opened state.

FIG. 15 shows the foldable fairing integrated footstep unit 4 of FIG. 13 and FIG. 14 with the outer shell 6 in the opened state. In the opened state, the flat stepping board 21a is in its extended status. Furthermore, the movement limiter 27 is now blocked by the movement limiting support 29 so that any further pivotal movement of the spring-loaded link 22 around the rotatable connection 25 in the stepping element extension direction 22a of FIG. 9 is prevented, as the predefined, maximum allowed opening angle of the foldable fairing integrated footstep unit 4 is reached.

It should be noted that modifications to the above described embodiments are within the common knowledge of the person skilled in the art and, thus, also considered as being part of the present invention. For instance, as the inventive foldable fairing integrated footstep unit is operated manually by an activation of the sliding door, there is no need for conventionally used power driven systems, which will create additional space and the flat surface of the inventive foldable fairing integrated footstep unit in closed state provides sufficient space e. g. for lifesaving emergency systems to be assembled within the subfloor region of a given rotary wing aircraft. These lifesaving emergency systems can e. g. be activated by ejecting the unfolding/folding unit of the inventive foldable fairing integrated footstep unit, thereby opening the latter such that e. g. a respective lifesaving raft system can be deployed, thus, allowing to get all passengers out of the rotary wing aircraft for guaranteeing their safety in case of emergency situations. It should further be noted that the drawings are only intended for schematically representing embodiments of the present invention and not for showing detailed constructions thereof.

REFERENCE LIST 1 rotary wing aircraft
1a aircraft airframe
1b tail boom
1c tail wing
1d fin
1e drive system accommodating region 1*f* aircraft fairing
1*g* board side wall resp. lateral fairing
1*h* starboard side wall resp. lateral fairing
1*i* outer shell aperture
2 aircraft doors and windows
2*a* sliding door
2*b* sliding door rail
2*c* sliding guide
3 maintenance traps
4 foldable fairing integrated footstep unit
4*a* foldable fairing integrated footstep unit housing
5 aircraft emergency exits
6 footstep outer shell
6*a* footstep outer shell exterior surface
7 slider links
7*a* left-hand side slider link
7*b* right-hand side slider link
8 fairing brackets
8*a* left-hand side fairing bracket
8*b* right-hand side fairing bracket
8*c* additional fairing bracket
9 slide pin guides
9*a* left-hand side slide pin guide
9*b* right-hand side slide pin guide
10 slide pins
10*a* left-hand side slide pin
10*b* right-hand side slide pin
11 guiding link
11*a* guiding strut
12 couplers
12*a* footstep-sided coupler
12*b* door-sided coupler
13 pivot pin
14 sliding mechanism
14*a* door-sided sliding mechanism support
14*b* coupling mechanism
15 sliding door opening movement direction
16 foldable fairing integrated footstep unit unfolding direction
17 footstep outer shell hinge
18 slider link hinge
19 cable connection
19*a* cable
19*b* cable connector
19*c* cable socket
20 double arm connection
20*a* upper arm connector
20*b* lower arm connector
20*c* arm hinge
20*d* upper double arm connection hinge
20*e* lower double arm connection hinge
21 extendible stepping element
21*a* flat stepping board
21*b* board extended status
21*c* board retracted status
21*d* board sliding area
22 spring-loaded link
22*a* stepping element extension trajectory
23 rotatable link to board connection
24 footstep outer shell bracket
25 rotatable link to bracket connection
26 pre-loading spring element
27 link movement limiter
28 airframe-sided stopper
29 airframe-sided movement limiting support

What is claimed is:

1. A vehicle with a fairing and a sliding door that is glidingly mounted to the vehicle, wherein the sliding door is associated with a foldable fairing integrated footstep unit, and wherein the foldable fairing integrated footstep unit comprises:
   an outer shell that is integrated into the fairing of the vehicle, the outer shell comprising an exterior surface that creates in closed state of the foldable fairing integrated footstep unit an aerodynamic surface with the fairing,
   wherein an unfolding and folding unit connects the outer shell to the vehicle, the unfolding and folding unit comprising:
      a sliding mechanism that is adapted for being engaged by the sliding door at least during an opening gliding movement and a closing gliding movement of the sliding door, and
      a guiding link that connects the outer shell to the sliding mechanism;
      the unfolding and folding unit being provided for unfolding the foldable fairing integrated footstep unit into an opened state during the opening gliding movement of the sliding door and for folding the foldable fairing integrated footstep unit into the closed state during the closing gliding movement of the sliding door.

2. The vehicle of claim 1, wherein a housing is provided, the housing being adapted for accommodating the foldable fairing integrated footstep unit in the closed state such that the exterior surface of the outer shell creates the continuous aerodynamic surface with the fairing.

3. The vehicle of claim 1, wherein a door rail is provided, and wherein the sliding door and the sliding mechanism are glidingly mounted to the door rail.

4. The vehicle of claim 3, wherein the sliding door comprises at least one sliding mechanism support that is adapted for engaging the sliding mechanism at least during the opening gliding movement and the closing gliding movement of the sliding door.

5. The vehicle of claim 1, wherein the guiding link comprises at least one rigid strut.

6. The vehicle of claim 5, wherein the unfolding and folding unit further comprises:
   at least two couplers, wherein a first coupler is provided for rotatably coupling the at least one rigid strut to the outer shell, and wherein a second coupler is provided for rotatably coupling the at least one rigid strut to the sliding mechanism.

7. The vehicle of claim 1, wherein the foldable fairing integrated footstep unit further comprises:
   at least one slider link that is adapted for limiting an opening rotation of the outer shell during the opening gliding movement of the sliding door.

8. The vehicle of claim 7, wherein at least one bracket is provided, the at least one bracket being rigidly attached to the vehicle, and wherein the at least one slider link is rotatably mounted to the at least one bracket and comprises a pin guide that glidingly accommodates an associated slide pin provided at the outer shell.

9. The vehicle of claim 1, wherein the foldable fairing integrated footstep unit further comprises:
   at least one cable connection that is adapted for limiting an opening rotation of the outer shell during the opening gliding movement of the sliding door.

10. The vehicle of claim 9, wherein the at least one cable connection comprises a cable that is attached to the outer shell and connected to a cable socket that is accommodated in the vehicle for retracting the cable during the closing gliding movement of the sliding door.

11. The vehicle of claim 1, wherein the foldable fairing integrated footstep unit further comprises:
at least one double arm connection that is adapted for limiting an opening rotation of the outer shell during the opening gliding movement of the sliding door.

12. The vehicle of claim 11, wherein at least one bracket is provided, the at least one bracket being rigidly attached to the vehicle, wherein the at least one double arm connection comprises a first arm that is rotatably mounted to the at least one bracket and a second arm that glidingly accommodates an associated slide pin provided at the outer shell, and wherein the first arm is rotatably mounted to the second arm.

13. The vehicle of claim 1, wherein the foldable fairing integrated footstep unit further comprises:
an extendible stepping element that is accommodated in the outer shell in the closed state of the foldable fairing integrated footstep unit and protruding from the outer shell in opened state of the foldable fairing integrated footstep unit.

14. The vehicle of claim 13, wherein the foldable fairing integrated footstep unit further comprises:
a spring-loaded link that is provided for moving the extendible stepping element during the opening gliding movement of the sliding door such that the extendible stepping element protrudes from the outer shell in opened state of the foldable fairing integrated footstep unit.

15. A vehicle with a fairing and a sliding door glidingly mounted to the vehicle, wherein the sliding door is associated with a foldable fairing integrated footstep unit, and wherein the foldable fairing integrated footstep unit comprises:
an outer shell comprising an exterior surface that creates in a closed state of the foldable fairing integrated footstep unit an aerodynamic surface with the fairing,
wherein a guiding unit connects the outer shell to the vehicle, the guiding unit comprising:
a slider adapted for being engaged by the sliding door during an opening gliding movement and a closing gliding movement of the sliding door, and
a guiding link connecting the outer shell to the slider;
the guiding unit provided for unfolding the foldable fairing integrated footstep unit into an opened state during an opening gliding movement of the sliding door and for folding the foldable fairing integrated footstep unit into the closed state during a closing gliding movement of the sliding door.

16. The vehicle of claim 15, further comprising a housing adapted for accommodating the foldable fairing integrated footstep unit in the closed state such that the exterior surface of the outer shell creates the continuous aerodynamic surface with the fairing.

17. The vehicle of claim 1, further comprising a door rail, the sliding door and the slider are glidingly mounted to the door rail, the sliding door comprising at least one sliding support adapted for engaging the slider during the opening gliding movement and the closing gliding movement of the sliding door.

18. The vehicle of claim 1, wherein the guiding link comprises a rigid strut, and wherein the unfolding and folding unit further comprises:
at least two couplers, wherein a first coupler rotatably coupling the rigid strut to the outer shell, and wherein a second coupler rotatably coupling the rigid strut to the slider.

19. A rotary wing aircraft with a fairing and a sliding door glidingly mounted to the rotary wing aircraft, the sliding door associated with a foldable fairing integrated footstep unit, the foldable fairing integrated footstep unit comprising:
an outer shell comprising an exterior surface capable of forming in a closed state of the foldable fairing integrated footstep unit an aerodynamic surface with the fairing,
a guiding unit connecting the outer shell to the rotary wing aircraft, the guiding unit comprising:
a slider adapted for being engaged by the sliding door during an opening gliding movement and a closing gliding movement of the sliding door, and
a guide connecting the outer shell to the slider;
the guide adapted to unfold the foldable fairing integrated footstep unit into an opened state during an opening gliding movement of the sliding door and to fold the foldable fairing integrated footstep unit into the closed state during a closing gliding movement of the sliding door.

20. The rotary wing aircraft of claim 19, further comprising a housing adapted for accommodating the foldable fairing integrated footstep unit in the closed state.

* * * * *